US012656741B2

(12) United States Patent
Oshita et al.

(10) Patent No.: US 12,656,741 B2
(45) Date of Patent: Jun. 16, 2026

(54) ELECTRONIC TIMEPIECE, STORAGE MEDIUM STORING PROGRAM, AND TIME CORRECTION METHOD

(71) Applicant: CASIO COMPUTER CO., LTD., Shibuya-ku (JP)

(72) Inventors: Yuuki Oshita, Nerima-ku (JP); Chiharu Shiratori, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 320 days.

(21) Appl. No.: 18/368,259

(22) Filed: Sep. 14, 2023

(65) Prior Publication Data

US 2024/0103448 A1 Mar. 28, 2024

(30) Foreign Application Priority Data

Sep. 26, 2022 (JP) ................................ 2022-152084

(51) Int. Cl.
*G04G 7/00* (2006.01)
*G04R 20/04* (2013.01)

(52) U.S. Cl.
CPC ............. *G04G 7/023* (2013.01); *G04R 20/04* (2013.01)

(58) Field of Classification Search
CPC . G04G 7/023; G04G 7/00; G04G 7/02; G04R 20/04
See application file for complete search history.

(56) References Cited

U.S. PATENT DOCUMENTS 10,372,087 B2 8/2019 Sekitsuka et al.
2004/0190378 A1* 9/2004 Farmer ............... H04W 56/005 368/47
2004/0225439 A1* 11/2004 Gronemeyer ......... G06F 1/3287 701/469
2008/0074950 A1* 3/2008 Rostrom ................ G04R 20/04 368/10
2019/0391538 A1 12/2019 Kitamura

FOREIGN PATENT DOCUMENTS

JP 2000341152 A 12/2000
JP 2007286065 A 11/2007
JP 2018159644 A 10/2018
JP 2019086442 A 6/2019

OTHER PUBLICATIONS

Extended European Search Report (EESR) dated Feb. 23, 2024, issued in counterpart European Application No. 23198754.6.

* cited by examiner

*Primary Examiner* — Edwin A. Leon
*Assistant Examiner* — Jason M Collins
(74) *Attorney, Agent, or Firm* — Holtz, Holtz & Volek PC

(57) ABSTRACT

An electronic timepiece includes an obtaining circuit, a first processor and a second processor. The obtaining circuit obtains information on current time from outside. The first processor measures time. The second processor is connected to the obtaining circuit. The first processor obtains a synchronization signal corresponding to the current time, obtains the current time, which the second processor obtains from the obtaining circuit, and based on the current time and the synchronization signal, corrects the measuring time, which the first processor is measuring.

13 Claims, 5 Drawing Sheets

ELECTRONIC TIMEPIECE, STORAGE MEDIUM STORING PROGRAM, AND TIME CORRECTION METHOD

TECHNICAL FIELD

The present disclosure relates to an electronic timepiece, a storage medium storing a program, and a time correction method.

DESCRIPTION OF RELATED ART

A processor (microcontroller) used in a conventional electronic timepiece is prone to be insufficient in arithmetic processing capacity as a processor of an electronic timepiece that performs various types of processing, such as a smartwatch or a multifunctional electronic timepiece. Meanwhile, such an electronic timepiece spends a long period of time only for measuring and displaying the date and time, which is conventional processing, without executing its various functions. If, in an electronic timepiece, a processor having a sufficient arithmetic processing capacity for various functions is operated all the time, power consumption increases unnecessarily. In order to deal with this, there is a technique of providing an electronic timepiece with two types of processors having different arithmetic processing capacities and turning on/off, of the processors, a processor having a higher arithmetic processing capacity in accordance with its necessity/unnecessity.

As mentioned above, if processes are divided and assigned to a plurality of processors, the processors may need to exchange data. In such an electronic timepiece, inconvenience could occur in real time processing mainly due to a processor having a lower arithmetic processing capacity. In JP 2019-86442 A, there is disclosed a technique for display control in a case where a process of measuring the date and time and a process of controlling display on a display screen are assigned to different processors.

However, if a controller having a higher arithmetic processing capacity performs control to obtain time information from outside, a difference in processing timing may be generated between the controller and a controller having a lower arithmetic processing capacity. As a result, an electronic timepiece having such controllers may not be able to correct the measuring time accurately.

SUMMARY OF THE INVENTION

According to an aspect of the present disclosure, there is provided an electronic timepiece including:

- an obtaining circuit that obtains information on current time from outside;
- a first processor that measures time; and
- a second processor connected to the obtaining circuit,
- wherein the first processor
  - obtains a synchronization signal corresponding to the current time,
  - obtains the current time, which the second processor obtains from the obtaining circuit, and
  - based on the current time and the synchronization signal, corrects the measuring time, which the first processor is measuring.

Further features of the present invention will become apparent from the following description of exemplary embodiments (with reference to the attached drawings).

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

First Embodiment

Figure 1:
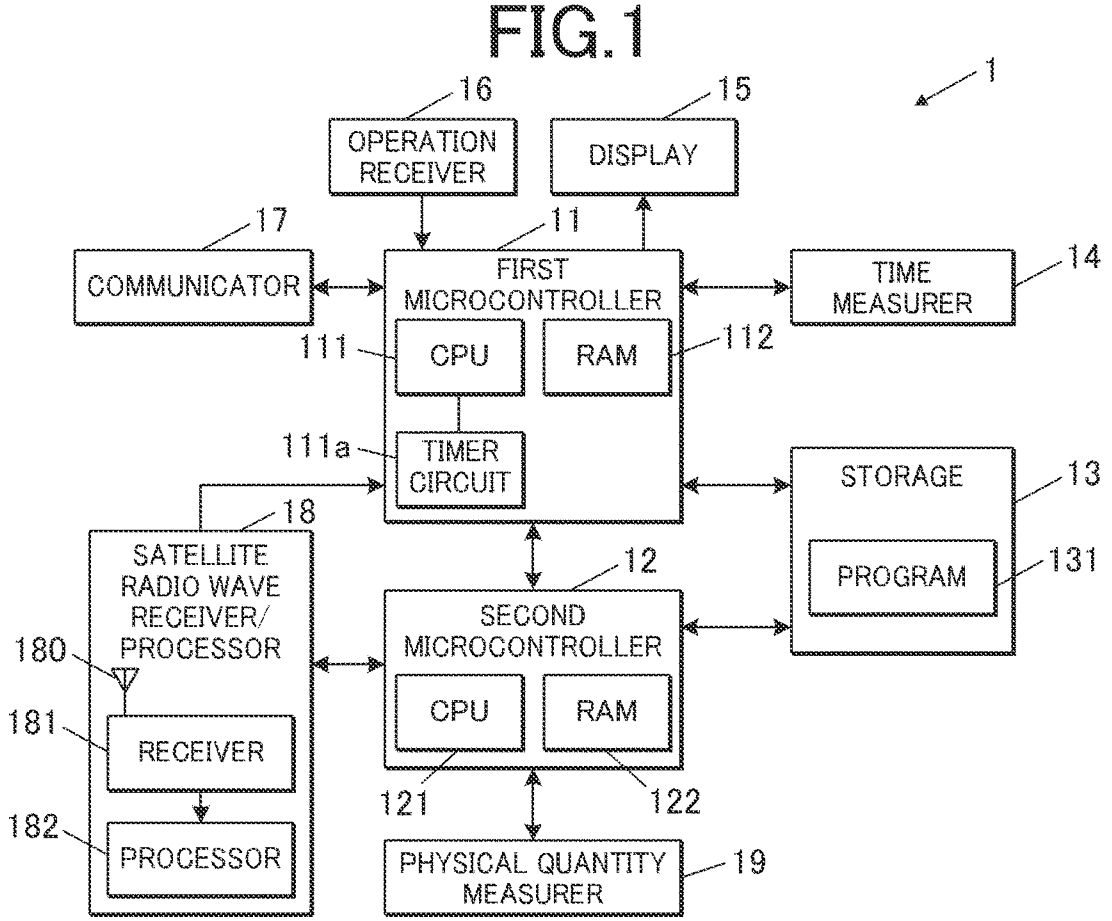
FIG. 1 is a block diagram showing a functional configuration of an electronic timepiece of an embodiment.

FIG. 1 is a block diagram showing a functional configuration of an electronic timepiece 1 of a first embodiment.

The electronic timepiece 1 includes a first microcontroller 11 (microcontroller unit or MCU; first processor), a second microcontroller 12 (second processor), a storage 13, a time measurer 14, a display 15, an operation receiver 16, a communicator 17, a satellite radio wave receiver/processor 18 (obtaining circuit), and a physical quantity measurer 19.

The first microcontroller 11 includes a central processing unit (CPU) 111 and a random access memory (RAM) 112. The CPU 111 is a processor that performs arithmetic processing and performs control in accordance with programs. The RAM 112 provides a working memory space for the CPU 111 and stores temporary data. The first microcontroller 11 also includes a not-shown input/output interface. The first microcontroller 11 directly controls the time measurer 14, the display 15, the operation receiver 16 and the communicator 17. The first microcontroller 11 operates continuously. The first microcontroller 11 is capable of measuring the amount of time as/with a timer (timer measurement), which will be described later. The timer measurement may be performed by the CPU 111 or a timer circuit 111*a* connected to the CPU 111. The first microcontroller 11 is designed to be suitable for low-load arithmetic processing, in particular, for time measurement and control to display the measured time, and operates efficiently with low power consumption at a low load. Meanwhile, if a high load is applied to the first microcontroller 11, its processing efficiency decreases, and the power consumption increases greatly as the load increases. The first microcontroller 11 operates continuously, except, for example, when power supply is insufficient.

The second microcontroller 12 includes a CPU 121 and a RAM 122. The CPU 121 has a higher arithmetic processing capacity than the CPU 111. Accordingly, basic power consumption of the second microcontroller 12 is larger than that of the first microcontroller 11. Meanwhile, during high-load processing, the second microcontroller 12 performs the processing with a high efficiency and consumes less power in the entire processing than the first microcontroller 11. Thus, the power efficiency of the second microcontroller 12 is lower during low-load processing and higher during high-load processing than that of the first microcontroller 11. The RAM 122 provides a working memory space for the CPU 121 and stores temporary data. The second microcontroller 12 also includes a not-shown input/output interface. The second microcontroller 12 directly controls the satellite radio wave receiver/processor 18 and the physical quantity measurer 19, and processes measured data and calculated data input therefrom. Operation of the second microcontroller 12 is stopped by the control of the first microcontroller 11 or spontaneously stops, when it is unnecessary.

The storage 13 is a nonvolatile memory that stores programs including a program 131, various setting data and so forth. The storage 13 is not limited to but is a flash memory. At least part of the storage 13 can be directly accessed by both the first microcontroller 11 and the second microcontroller 12.

The time measurer 14 has a theoretical regulation circuit that divides frequency signals of a certain frequency, e.g., about 32.768 kHz, output from a not-shown oscillation circuit, thins out a signal(s) at appropriate intervals, and outputs a time measurement signal every second. The first microcontroller 11 measures and identifies the current date and time (time) on the basis of the time measurement signal(s) output from the time measurer 14. The first microcontroller 11 can identify the current date and time with approximately a standard date-and-time measurement precision of electronic timepieces, for example, within the range of error of 0.5 seconds or less per day.

The display 15 includes, for example, a digital display screen, and under the control of the first microcontroller 11, causes the display screen to display the current time (and date) and/or contents corresponding to other functional actions. The digital display screen is not limited to but a liquid crystal display (LCD) screen.

The operation receiver 16 receives input operations from outside, for example, from a user, and outputs operation signals corresponding to the input operations to the first microcontroller 11. The operation receiver 16 includes, for example, a touchscreen superimposed on the display screen. In addition to or instead of this, the operation receiver 16 may include a pushbutton switch, a rotational operation part (crown) and so forth.

The communicator 17 controls data communication in accordance with a communication standard to transmit and receive data to and from external devices. The communicator 17 includes an antenna and a module capable of controlling Bluetooth® communication or the like. The communication standard in this case does not need to be the one that transfers large-volume data at a high speed, and hence may be Bluetooth Low Energy.

The satellite radio wave receiver/processor 18 includes an antenna 180, a receiver 181 and a processor 182. The antenna 180 receives radio waves from positioning satellites of the global navigation satellite system (GNSS). The receiver 181 includes a receiving circuit that demodulates and decodes the radio waves received by the antenna 180. The receiving circuit may have a dedicated circuit to identify coarse acquisition (C/A) codes and demodulate navigation messages. Positioning satellites from which radio waves are received may include satellites of the global positioning system (GPS). The processor 182 identifies the current date and time on the basis of the demodulated navigation message(s) (obtains information on current time from outside), and also performs arithmetic processing of calculating the current position (positioning). The processor 182 may be a dedicated CPU specialized in navigation message decryption and positioning calculation, or may be a general-purpose CPU. The antenna 180, the receiver 181 and the processor 182 are connected by signal lines along the flow of radio wave signals received, and constitute the obtaining circuit of this embodiment.

The satellite radio wave receiver/processor 18 receives electric signals (control signals) transmitted from the second microcontroller 12 via a signal line(s) and operates on the basis of the received control signals, so that its operation (actions) is controlled by the second microcontroller 12. Further, power supply to (operation of) the satellite radio wave receiver/processor 18 is switched (to be ON or OFF) in accordance with its necessity. While operating, the satellite radio wave receiver/processor 18 regularly outputs a second synchronization signal, identified information (date and time with/without position) and information on precision of the identified information. The satellite radio wave receiver/processor 18 adjusts the second synchronization signal to synchronize with the current date and time when identifying the current date and time.

The physical quantity measurer 19 includes a sensor(s) that measures a physical quantity, and outputs a measurement result(s) (measured data) by the sensor to the second microcontroller 12. Examples of the sensor(s) include an accelerometer for measuring the motion state and the moving direction of the user, a magnetic sensor, and an atmospheric pressure sensor. In addition to or instead of this/these, the physical quantity measurer 19 may include a pulse sensor for detecting the vital state of the user.

Next, operation of the electronic timepiece 1 to correct the measuring date and time (time correction method of this embodiment) will be described.

While measurement of the date and time is controlled by the first microcontroller 11 as described above, reception of the right date and time by/from the satellite radio wave receiver/processor 18 is controlled by the second microcontroller 12. The first microcontroller 11 requests the second microcontroller 12 to (i) cause the satellite radio wave receiver/processor 18 to operate and (ii) obtain the current date and time from the satellite radio wave receiver/processor 18. The first microcontroller 11 obtains the current date and time from the second microcontroller 12 when the second microcontroller 12 obtains the current date and time.

The first microcontroller 11 needs to correct the current date and time to match an exact changing timing of seconds (timing of an exact second the decimal place of which is "0"). The second microcontroller 12 does not need to obtain the timing of an exact second from the satellite radio wave receiver/processor 18 because the second microcontroller 12 itself does not measure the current date and time. Hence, the satellite radio wave receiver/processor 18 outputs a second synchronization signal (synchronization signal), which indicates the changing timing of seconds, to the first microcontroller 11. The first microcontroller 11 corrects its measuring (current) date and time (time) on the basis of the current date and time obtained from the second microcontroller 12, namely, by synchronizing the obtained current date and time with the second synchronization signal.

Figure 2:
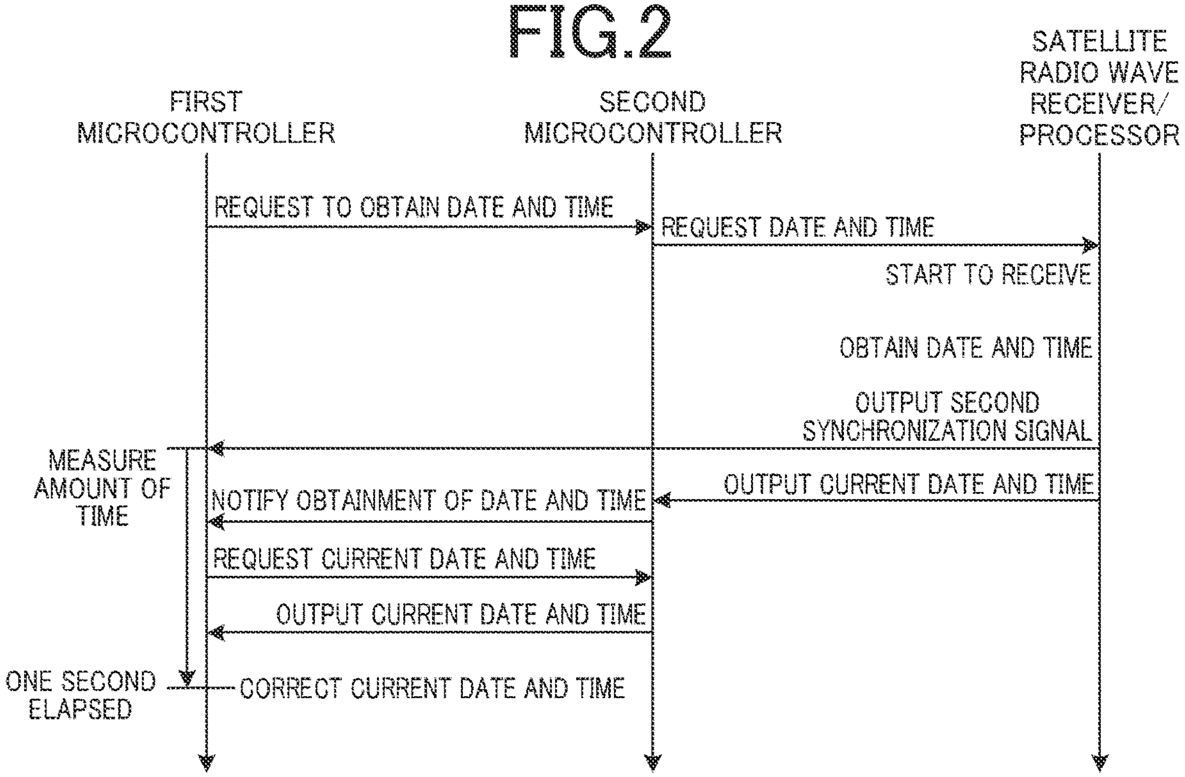
FIG. 2 is a sequence diagram showing the flow of a process for correcting the date and time with a satellite radio wave receiver/processor, a first microcontroller and a second microcontroller.

FIG. 2 is a sequence diagram showing the flow of a process for correcting the date and time with the satellite radio wave receiver/processor 18, the first microcontroller 11 and the second microcontroller 12.

The first microcontroller 11 transmits a request to obtain the (current) date and time (date-and-time obtainment request) to the second microcontroller 12. When receiving this request, the second microcontroller 12 causes the satellite radio wave receiver/processor 18 to operate and requests information on the date and time therefrom.

The satellite radio wave receiver/processor 18 starts to receive radio waves from a positioning satellite(s), after being started if not yet. The satellite radio wave receiver/processor 18 obtains the date and time on the basis of the radio waves received from one or more positioning satellites. The satellite radio wave receiver/processor 18 outputs a second synchronization signal to the first microcontroller 11. Also, the satellite radio wave receiver/processor 18 outputs the current date and time to the second microcontroller 12. When receiving the current date and time, the second microcontroller 12 outputs a date-and-time obtainment notification (obtaining-done notification) to the first microcontroller 11.

When receiving the second synchronization signal, the first microcontroller 11 starts to measure a preset amount of time as/with a timer (timer measurement). The timer, namely, the amount of time to be measured, is in units of seconds (N second(s)); in this embodiment, one second, for example. When receiving the date-and-time obtainment notification from the second microcontroller 12 after starting the timer measurement (after receiving the second synchronization signal), the first microcontroller 11 returns/transmits a request for the current date and time (current date-and-time request) to the second microcontroller 12.

When receiving the current date-and-time request, the second microcontroller 12 outputs the current date and time to the first microcontroller 11. The first microcontroller 11 obtains this current date and time. The "N second(s)" to be measured is set to be equal to or longer than a period from when the first microcontroller 11 starts the timer measurement until when the first microcontroller 14 obtains the current date and time. The first microcontroller 11 corrects the measuring date and time to the date and time of the "obtained current date and time+N second(s)" at the timing at which the first microcontroller 14 finishes the timer measurement.

Figure 3:
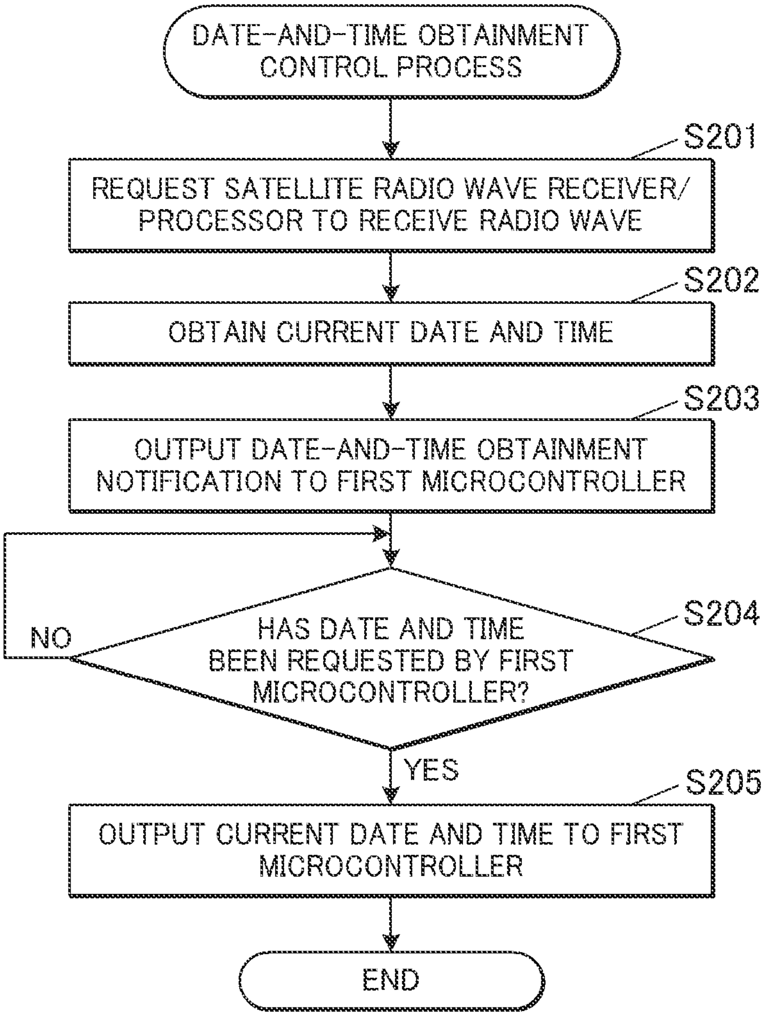
FIG. 3 is a flowchart showing a control procedure of a date-and-time obtainment control process that is performed by the second microcontroller.

FIG. 3 is a flowchart showing a control procedure of a date-and-time obtainment control process that is performed by the second microcontroller 12. This date-and-time obtainment control process is started when the second microcontroller 12 obtains (receives) a date-and-time obtainment request from the first microcontroller 11.

The CPU 121 of the second microcontroller 12 requests the satellite radio wave receiver/processor 18 to receive a radio wave(s), which is relevant to the obtainment of the date and time, from a positioning satellite(s), after starting the satellite radio wave receiver/processor 18 if not yet (Step S201). The CPU 121 waits for and receives an input from the satellite radio wave receiver/processor 18, thereby obtaining the current date and time (Step S202).

The CPU 121 outputs a date-and-time obtainment notification to the first microcontroller 11 (Step S203). The CPU 121 determines whether it has been requested by the first microcontroller 11 to output the current date and time (Step S204). If the CPU 121 determines that it has not been requested by the first microcontroller 11 to output the current date and time (Step S204: NO), the CPU 121 repeats Step S204.

If the CPU 121 determines that it has been requested by the first microcontroller 11 to output the current date and time (S204: YES), the CPU 121 outputs the current date and time to the first microcontroller 11 (Step S205). After outputting the current date and time, the CPU 121 may delete data of the current date and time. The CPU 121 then ends the date-and-time obtainment control process.

Figure 4:
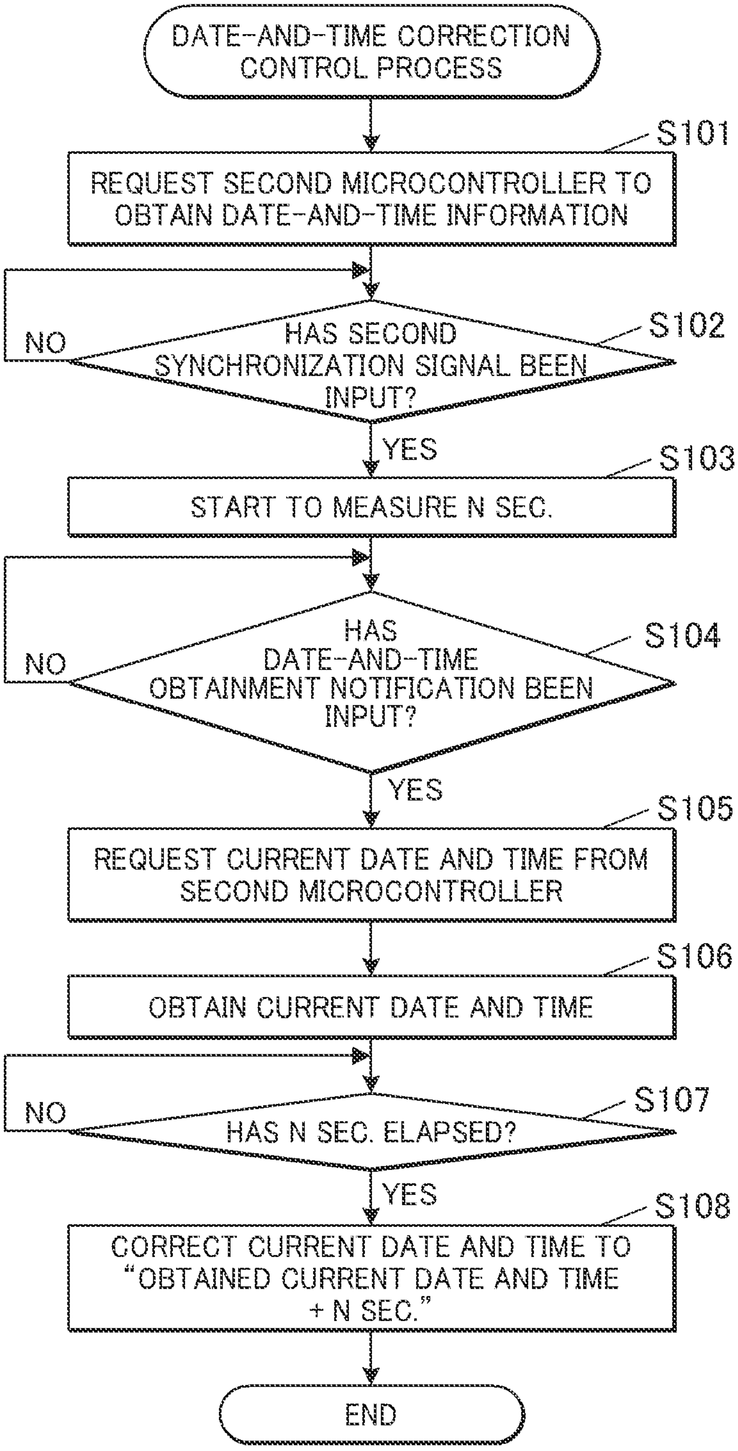
FIG. 4 is a flowchart showing a control procedure of a date-and-time correction control process that is performed by the first microcontroller.

FIG. 4 is a flowchart showing a control procedure of a date-and-time correction control process that is performed by the first microcontroller 11. This date-and-time correction control process is started automatically at a predetermined timing (e.g., at a specific time of every day) or in response to a certain (predetermined) input operation by the user onto the operation receiver 16.

The CPU 111 of the first microcontroller 11 requests the second microcontroller 12 to obtain information on the date and time (Step S101). The CPU 111 determines whether it has received (obtained) a second synchronization signal from the satellite radio wave receiver/processor 18, namely, whether a second synchronization signal has been input from the satellite radio wave receiver/processor 18 (Step S102). If the CPU 111 determines that it has not received a second synchronization signal (S102: NO), the CPU 111 repeats Step S102.

If the CPU 111 determines that it has received a second synchronization signal (Step S102: YES), the CPU 111 starts to measure a set period (N second(s)) as/with a timer (Step S103). This process in Step S103 needs to be performed at the timing at which the second synchronization signal is input. The "at the timing" herein means without a delay after Step S102 determined to be "YES" except an unavoidable delay time in terms of processing. The unavoidable delay time includes a time taken by the determination process, a processing time by the CPU 111, and/or a signal transmission time, for example.

The CPU 111 determines whether it has received a date-and-time obtainment notification from the second microcontroller 12, namely, a date-and-time obtainment notification has been input from the second microcontroller 12 (Step S104). If the CPU 111 determines that it has not received a date-and-time obtainment notification (Step S104: NO), the CPU 111 repeats Step S104.

If the CPU 111 determines that it has received a date-and-time obtainment notification (Step S104: YES), the CPU 111 requests the current date and time from the second microcontroller 12 (Step S105). The CPU 111 waits for and receives an input from the second microcontroller 12, thereby obtaining the current date and time (Step S106).

The CPU 111 determines whether the set period (N second(s)) has elapsed from the start of the timer measurement (Step S107). For example, the timer circuit **111*a* outputs an interrupt signal or the like to the CPU 111 when measured the set period. If the CPU 111 determines that the set period has not elapsed, namely, it has not detected an interrupt signal or the like (Step S107: NO), the CPU 111 repeats Step S107. If the CPU 111 determines that the set period has elapsed, namely, it has detected an interrupt signal or the like (S107: YES), the CPU 111 corrects the current date and time (measuring date and time) to the date and time of the "obtained current date and time+N second (s)" (Step S108). That is, the CPU 111 corrects the current date and time at the timing of the second synchronization signal delayed by N second(s) (by synchronizing the current time with the second synchronization signal, i.e., without a delay after Step S107 determined to be "YES"). The CPU 111** then ends the date-and-time correction control process.

As described above, the electronic timepiece 1 of the first embodiment includes the satellite radio wave receiver/processor 18 that obtains information on the current time (date and time) from outside (positioning satellite(s)), the first microcontroller 11 that measures the time (date and time), and the second microcontroller 12 connected to the satellite radio wave receiver/processor 18. The first microcontroller 11 obtains the current time that the second microcontroller 12 obtains from the satellite radio wave receiver/processor 18 and obtains a synchronization signal (e.g., second synchronization signal) corresponding to the current time from the satellite radio wave receiver/processor 18 (or the second microcontroller 12 in a second embodiment described later). The first microcontroller 11 then corrects its measuring time on the basis of the obtained current time and the obtained synchronization signal.

Transmission of the (second) synchronization signal to the first microcontroller 11 can keep the time, which the first microcontroller 11 measures, right, while the second microcontroller 12 simply relays the current time. The second microcontroller 12 being in charge of controlling the satellite radio wave receiver/processor 18 causes no problem in time measurement. The first microcontroller 11 can obtain the right time and measure the time with its processing load appropriately reduced. Accordingly, the electronic timepiece 1 can keep the measuring (date and) time right while keeping the loads of the first microcontroller 11 and the second microcontroller 12 in their appropriate ranges. Therefore, the electronic timepiece 1 can significantly reduce power to be consumed by a timepiece action(s), and stably continue to measure and display the (date and) time over a long period of time, thereby being able to fulfill its basic role as a timepiece.

Further, the second microcontroller 12 obtains the current time from the satellite radio wave receiver/processor 18, and the first microcontroller 11 obtains the synchronization signal from the satellite radio wave receiver/processor 18, obtains the current time from the second microcontroller 12, and corrects the measuring time by synchronizing the current time with the synchronization signal.

Transmission of only the synchronization signal directly from the satellite radio wave receiver/processor 18, which identifies the current time, to the first microcontroller 11 separately from (before) transmission of the information on the current time allows the first microcontroller 11 to obtain the timing information on the time with a high precision. Therefore, the first microcontroller 11 can correct the measuring time by applying the current time, which the first microcontroller 11 obtains from the second microcontroller 12, thereto at a right timing.

Further, when obtaining the synchronization signal, which corresponds to the current time, from the satellite radio wave receiver/processor 18, the first microcontroller 11 starts to measure a set period or causes the timer circuit 111*a* to start to measure the set period, and at the end of measuring the set period, the first microcontroller 11 corrects the measuring time on the basis of the set period and the current time obtained from the second microcontroller 12.

There may be a time lag between the synchronization signal directly transmitted from the satellite radio wave receiver/processor 18 to the first microcontroller 11 and the current time obtained by the first microcontroller 11 via the second microcontroller 12. To deal with this, it is set/determined that the first microcontroller 11 corrects the measuring time after a certain set period elapses from the input of the synchronization signal. Therefore, the electronic timepiece 1 can accurately correct the time, without generating an error in the time due to the time lag or the like.

Further, at the end of measuring the set period, the first microcontroller 11 corrects the measuring time to a value of the current time with the set period added. Since, as described above, the first microcontroller 11 corrects the measuring time after the set period elapses, the first microcontroller 11 corrects the measuring time by delaying the current time obtained from the satellite radio wave receiver/processor 18 via the second microcontroller 12 by the set period. Therefore, the electronic timepiece 1 can obtain the right time.

Further, when obtaining the information on the current time, the satellite radio wave receiver/processor 18 outputs the second synchronization signal to the first microcontroller 11 at a changing timing of seconds, when receiving the second synchronization signal, the first microcontroller 11 makes a request to the second microcontroller 12 for the current time, and when receiving the request from the first microcontroller 11, the second microcontroller 12 outputs the current time obtained from the satellite radio wave receiver/processor 18 to the first microcontroller 11.

Thus, the first microcontroller 11 requests and obtains the current time at an appropriate timing(s) after receiving the second synchronization signal, thereby being able to obtain the right time without generating an error in the time due to the time lag.

Further, when obtaining the current time from the satellite radio wave receiver/processor 18, the second microcontroller 12 outputs an obtaining-done notification (e.g., date-and-time obtainment notification) to the first microcontroller 11, and when receiving the second synchronization signal and the obtaining-done notification, the first microcontroller 11 makes a request to the second microcontroller 12 for the current time. Thus, the first microcontroller 11 obtains the current time after checking the notification from the second microcontroller 12, thereby being able to certainly prevent an error in the time and obtain the right time.

Further, the second microcontroller 12 does not measure the current time. Since, as described above, the first microcontroller 11, which operates continuously, can keep measuring the right time, the second microcontroller 12 does not need to measure the current time. Accordingly, the electronic timepiece 1 does not need to synchronize the first microcontroller 11 and the second microcontroller 12 in terms of the measuring (date and) time. Also, the electronic timepiece 1 does not need to be provided with a time measurer for the second microcontroller 12 to measure the current time.

Further, the satellite radio wave receiver/processor 18 includes the receiver 181 that receives a radio wave(s) from a positioning satellite(s), and identifies the current time on the basis of the radio wave received from the positioning satellite. The second microcontroller 12, which has a high arithmetic processing capacity, controls the satellite radio wave receiver/processor 18. Therefore, the processing loads of the first microcontroller 11 and the second microcontroller 12 can be made more appropriate, and the electronic timepiece 1 can continue to measure the right time more stably.

Further, in the electronic timepiece 1, the power efficiency of the second microcontroller 12 is lower during low-load processing and higher during high-load processing than the power efficiency of the first microcontroller 11. That is, in the electronic timepiece 1, the second microcontroller 12 performs high-load processing, so that the processing load of the first microcontroller 11 can be reduced not to greatly exceed the processing load necessary for the functions of measuring and displaying the (date and) time. In the electronic timepiece 1, the second microcontroller 12 manages operation of the high-load satellite radio wave receiver/processor to appropriately convey information on the right time to the first microcontroller 11. Therefore, the electronic timepiece 1 can continue to measure the right time more efficiently.

The program 131 of this embodiment is executable by the electronic timepiece 1 including the satellite radio wave receiver/processor 18 that obtains information on the current time (date and time) from outside, the first microcontroller 11 that measures the time (date and time), and the second microcontroller 12 connected to the satellite radio wave receiver/processor 18. The program 131 causes the first microcontroller 11 to obtain the current time that the second microcontroller 12 obtains from the satellite radio wave receiver/processor 18 and obtain a synchronization signal (e.g., second synchronization signal) corresponding to the current time from the satellite radio wave receiver/processor 18 (or the second microcontroller 12 in the second embodiment described later), and correct its measuring time by synchronizing the current time with the synchronization signal.

Thus, the program 131 controls operation of the first microcontroller 11 in the case where the first microcontroller 11, which measures the time, obtains the current time via the second microcontroller 12. Under this control, the first microcontroller 11 receives the (second) synchronization signal from the satellite radio wave receiver/processor 18 (or the second microcontroller 12 in the second embodiment). In this manner, the right time is conveyed to the first microcontroller 11 easily without the second microcontroller 12 measuring the time on the basis of the current time from the satellite radio wave receiver/processor 18. The second microcontroller 12 controlling the satellite radio wave receiver/processor 18 causes no problem in measurement of the right date and time, and the electronic timepiece 1 can keep the processing loads of the first microcontroller 11 and the second microcontroller 12 appropriate.

The time correction method of this embodiment is a time correction method that is performed by the electronic timepiece 1 including the satellite radio wave receiver/processor 18 that obtains information on the current time (date and time) from outside, the first microcontroller 11 that measures the time, and the second microcontroller 12 connected to the satellite radio wave receiver/processor 18. The method includes, with the first microcontroller 11, obtaining the current time that the second microcontroller 12 obtains from the satellite radio wave receiver/processor 18 and obtaining a synchronization signal (e.g., second synchronization signal) corresponding to the current time, and correcting the measuring time by synchronizing the current time with the synchronization signal.

With this time correction method, the first microcontroller 11 corrects the measuring time on the basis of the current time obtained from the satellite radio wave receiver/processor 18 via the second microcontroller 12, thereby being able to keep measuring the right time. Further, the second microcontroller 12 controls operation of the satellite radio wave receiver/processor 18. Therefore, the method can prevent the processing load of the first microcontroller 11 from being excessive, so that the first microcontroller 11 can continuously and stably measure the right time.

Second Embodiment

Figure 5:
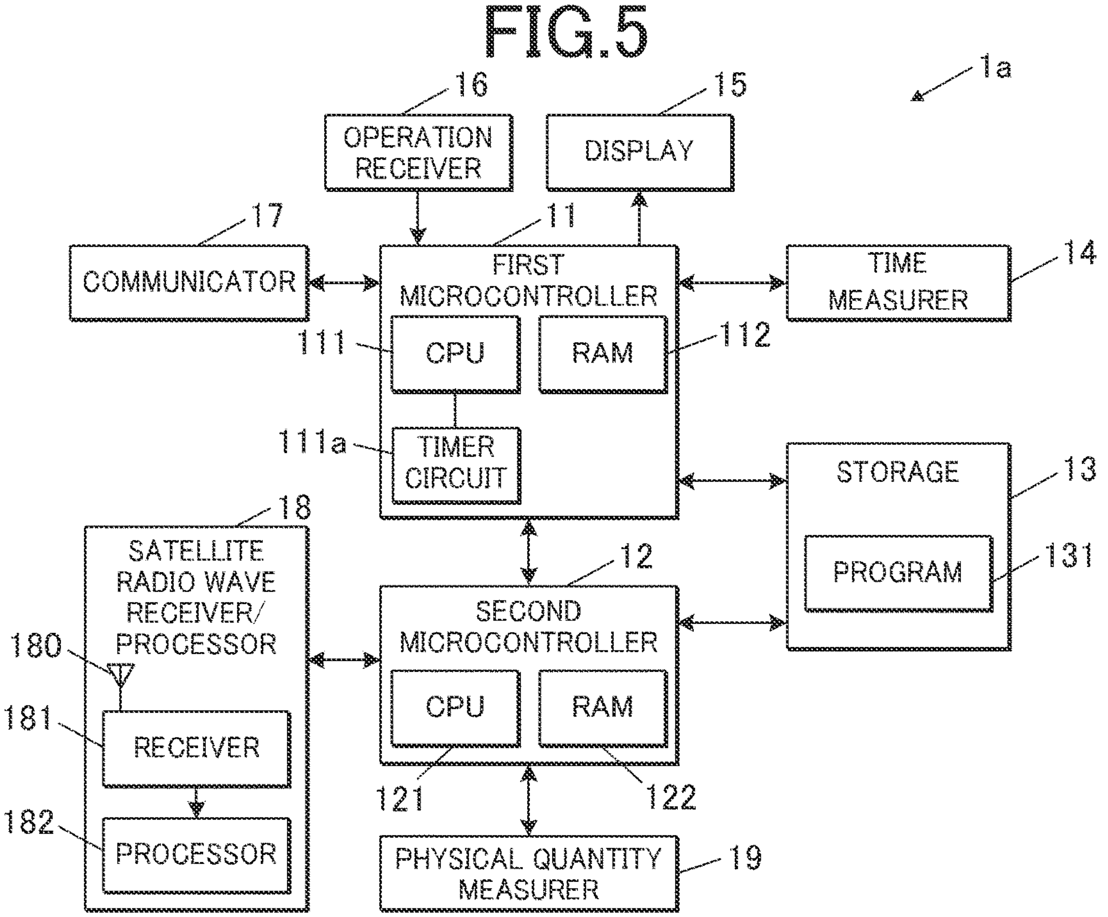
FIG. 5 is a block diagram showing a functional configuration of an electronic timepiece of a second embodiment.

FIG. 5 is a block diagram showing a functional configuration of an electronic timepiece 1*a* of a second embodiment. The electronic timepiece 1*a* is the same as the electronic timepiece 1 of the first embodiment in configuration except that no connection is provided between the first microcontroller 11 and the satellite radio wave receiver/processor 18 to transmit a second synchronization signal. The components same as those of the first embodiment are given the same reference signs, and their descriptions will be omitted.

Figure 6:
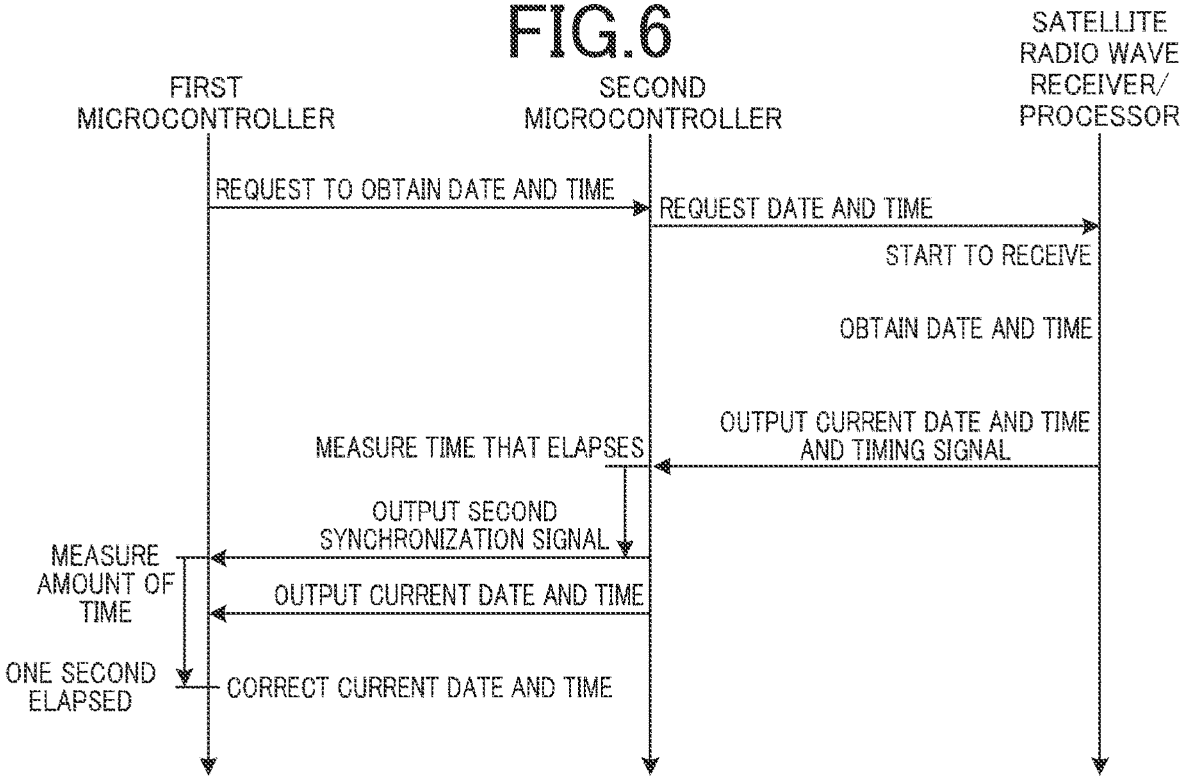
FIG. 6 is a sequence diagram showing the flow of a process for correcting the date and time in the electronic timepiece of the second embodiment.

FIG. 6 is a sequence diagram showing the flow of a process for correcting the date and time with the satellite radio wave receiver/processor 18, the first microcontroller 11 and the second microcontroller 12 of the electronic timepiece 1*a* of the second embodiment.

The satellite radio wave receiver/processor 18 that has received a request for information on the date and time from the second microcontroller 12, when obtaining the current date and time, outputs the current date and time (current time) and a timing signal (timing) to the second microcontroller 12. The timing signal in this case may not be a timing signal of the timing of an exact second. The current date and time may be expressed in units of less than a second, for example, in units of milliseconds.

The second microcontroller 12 measures the (amount of) time that elapses from (the input of) the timing signal, and outputs a second synchronization signal (synchronization signal) to the first microcontroller 11 at the timing of an exact second. The second microcontroller 12 also outputs the current date and time in units of seconds to the first microcontroller 11 at or after the timing of the exact second. Since the second microcontroller 12 does not have a time measurer, namely, a theoretical regulation circuit, the time until an exact second arrives is measured simply by counting input clock signals. Since an error in measurement of one to two seconds is equal to or less than one millisecond, an error in the current date and time that is conveyed to the first microcontroller 11 is negligible.

When receiving the second synchronization signal, the first microcontroller 11 starts to measure N second(s) (e.g., one second) as/with a timer (timer measurement). When finishing the timer measurement, the first microcontroller 11 corrects the current date and time to the date and time of the "obtained current date and time+N second(s)", the current date and time being obtained from the second microcontroller 12.

Figure 7A:
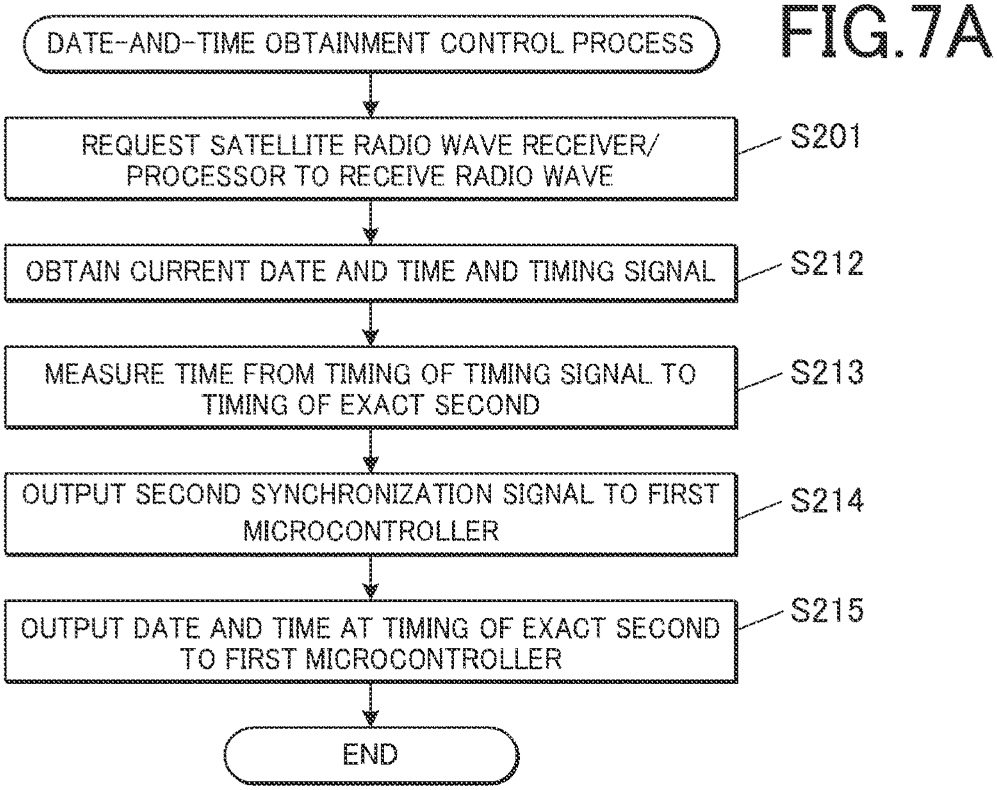
FIG. 7A is a flowchart showing a control procedure of a date-and-time obtainment control process in the electronic timepiece of the second embodiment.
Figure 7B:
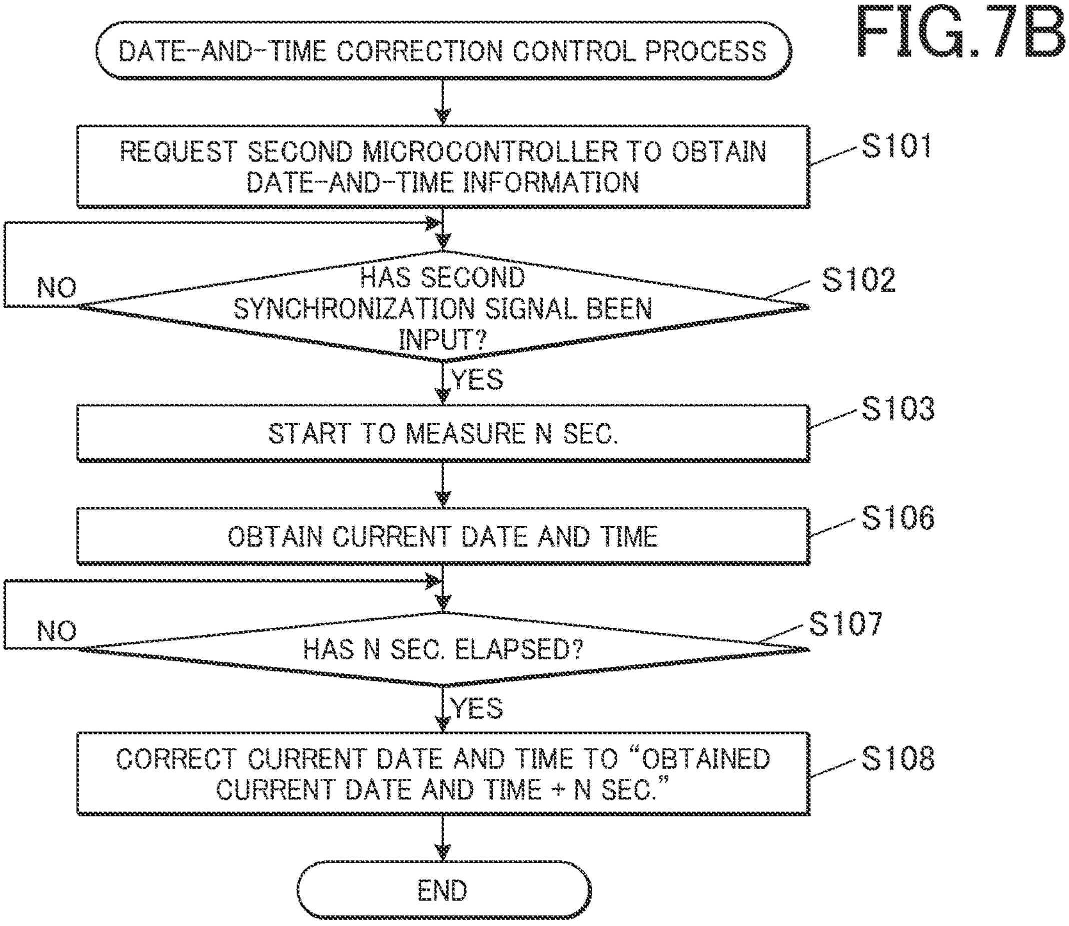
FIG. 7B is a flowchart showing a control procedure of a date-and-time correction control process in the electronic timepiece of the second embodiment.

FIG. 7A is a flowchart showing a control procedure of a date-and-time obtainment control process that is performed by the second microcontroller 12 of the electronic timepiece 1*a* of the second embodiment. FIG. 7B is a flowchart showing a control procedure of a date-and-time correction control process that is performed by the first microcontroller 11 of the electronic timepiece 1*a* of the second embodiment.

The date-and-time obtainment control process of the second embodiment is formed by replacing Steps S202 to S205 of the first embodiment with Steps S212 to S215.

After Step S201, the CPU 121 of the second microcontroller 12 obtains the current date and time (which may be in units of milliseconds) and a timing signal from the satellite radio wave receiver/processor 18 (Step S212). The CPU 121 measures the (amount of) time from the input timing of the timing signal to the timing of an exact second (Step S213).

The CPU 121 outputs a second synchronization signal to the first microcontroller 11 at the timing of the exact second (without a delay when an exact second arrives) (Step S214). The CPU 121 outputs the date and time (in units of seconds) at/of the timing of the exact second to the first microcontroller 11 (Step S215). The CPU 121 then ends the date-and-time obtainment control process.

The date-and-time correction control process of the second embodiment is the same as that of the first embodiment except that Steps S104, S105 are deleted. The process contents same as those of the first embodiment are given the same reference (step) numbers, and their descriptions will be omitted.

As described above, in the electronic timepiece 1*a* of the second embodiment, when obtaining the current time (date and time) from the satellite radio wave receiver/processor 18, the second microcontroller 12 outputs the current time and a synchronization signal (e.g., second synchronization signal) to the first microcontroller 11, and the first microcontroller 11 obtains the current time and the synchronization signal, which corresponds to the current time, from the second microcontroller 12, and corrects the measuring time by synchronizing the current time with the synchronization signal.

Thus, the second microcontroller 12 may generate and output the (second) synchronization signal to the first microcontroller 11, instead of the satellite radio wave receiver/processor 18 directly outputting the (second) synchronization signal to the first microcontroller 11. In this case, it is unnecessary to connect the satellite radio wave receiver/processor 18 to the first microcontroller 11. Although the processing load of the second microcontroller 12 slightly increases, no adverse effect is exerted on the first microcontroller 11, which measures the time. Therefore, the electronic timepiece 1*a* can obtain the right time easily and correct the current time, thereby being able to keep the right time.

Further, when obtaining the synchronization signal, which corresponds to the current time, from the second microcontroller 12, the first microcontroller 11 starts to measure a set period or causes the timer circuit 111*a* to start to measure the set period, and at the end of measuring the set period, the first microcontroller 11 corrects the measuring time on the basis of the set period and the current time obtained from the second microcontroller 12.

Even in the case where the first microcontroller 11 obtains both the synchronization signal and the current time from the second microcontroller 12, the first microcontroller 11 can correct the measuring time after a certain set period elapses from the input of the synchronization signal, taking a slight delay in terms of processing or the like into account. Therefore, the electronic timepiece 1 can correct the time more accurately.

The present disclosure is not limited to the above embodiments, and can be modified in a variety of respects.

For example, the second microcontroller 12 may measure the date and time as needed, for example, in response to a request from an application program that the second microcontroller 12 controls. In this case, the second microcontroller 12 may simply obtain, from the first microcontroller 11, the date and time that the first microcontroller 11 is measuring.

Further, in the first embodiment, a date-and-time obtainment notification is output from the second microcontroller 12 to the first microcontroller 11 to prevent the timing difference (e.g., time lag mentioned above), but this notification may not be output. Also, a current date-and-time request from the first microcontroller 11 to the second microcontroller 12 may not be made. Meanwhile, if the second microcontroller 12 has not obtained the current date and time yet or has obtained the current date and time but a reference period or more has elapsed from the obtainment of the current date and time when receiving a current date-and-time request from the first microcontroller 11, the second microcontroller 12 may output an error signal to cause the first microcontroller 11 not to correct the date and time.

Further, in the above embodiments, the second synchronization signal is input to the first microcontroller 11 to correct the date and time, but this is not a limitation. For example, a synchronization signal of a higher frequency may be input to the first microcontroller 11 if it does not make the processing load of the first microcontroller 11 excessive. Alternatively, a synchronization signal may not be a second synchronization signal, which is synchronized with the changing timing of seconds.

Further, the electronic timepiece 1 (or 1*a*) may have a plurality of second microcontrollers 12, one of which controls operation of the satellite radio wave receiver/processor 18.

Further, the first microcontroller 11 may not request the second microcontroller 12 to obtain the current date and time. Instead, the second microcontroller 12 may regularly and automatically cause the satellite radio wave receiver/processor 18 to operate to obtain the current date and time, and also cause the satellite radio wave receiver/processor 18 to output a second synchronization signal to the first microcontroller 11.

Further, in the above embodiments, the current date and time (date and time) is obtained and corrected, but only the time may be corrected.

Further, the current date and time may not be obtained by the satellite radio wave receiver/processor 18. For example, the current date and time may be obtained by a communication circuit that is connected to and controlled by the second microcontroller 12. In this case, for example, a timing signal may be generated on the basis of the timing at which the second microcontroller 12 obtains the current date and time from the communication circuit, which serves as the obtaining circuit, with a delay in communication or the like taken into account if necessary. The communication circuit may be located on a network card capable of Bluetooth® communication or the like, and obtain the current date and time and a timing signal from a communication/connection destination, such as a smartphone. The second microcontroller 12 may compensate a delay in reception of a timing signal if necessary.

Alternatively, to the second microcontroller 12, a standard radio wave receiver/processor that receives, demodulates and decrypts standard radio waves to identify the date and time may be connected. In this case, the standard radio wave receiver/processor as the obtaining circuit includes a receiving circuit that receives standard radio waves and a processor that binarizes received signal(s) (standard radio wave signal(s)) with a high-level signal and a low-level signal and decrypts the signal to identify the current date and time. The processor of the standard radio wave receiver/processor may output the current date and time and a timing signal to the second microcontroller 12, upon identifying the current date and time. Alternatively, the second microcontroller 12 may be configured to decrypt standard radio waves, determine the timing of each exact second, and identify the date and time. In this case, the second microcontroller 12 obtains, from the standard radio wave receiver/processor, the standard radio signal (the intensity of which changes in sync with the timing of each exact second) demodulated as time information and binarized by the processor of the standard radio wave receiver/processor. On the basis of this standard radio wave signal, the second microcontroller 12 generates a timing signal and identifies the current date and time.

Further, in the above embodiments, the first microcontroller 11 itself operates as a timer circuit or has a built-in timer circuit (i.e., timer circuit 111*a*), but this is not a limitation. An external timer circuit may be connected to the first microcontroller 11 and perform the timer measurement in response to a request from the CPU 111.

Further, in the above, the computer-readable storage medium storing the program 131 for performing control to correct the date and time of the present disclosure is the storage 13 constituted by a nonvolatile memory, such as a flash memory, or the like, but not limited thereto. The computer-readable storage medium may be another non-volatile memory, such as an HDD or an MRAM, or a portable storage medium, such as a CD-ROM or a DVD. Further, as a medium to provide data of the program(s) of the present disclosure via a communication line, a carrier wave can be used.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152084, filed Sep. 26, 2022 which is hereby incorporated by reference in its entirety.

The invention claimed is:

1. An electronic timepiece comprising:

an obtaining circuit that obtains information on a current time from outside;

a first processor that measures time; and a second processor connected to the obtaining circuit, wherein the first processor:

obtains a synchronization signal corresponding to the current time from the obtaining circuit, obtains the current time, which the second processor obtains from the obtaining circuit, from the second processor, and corrects the measuring time, which the first processor is measuring, by synchronizing the current time with the synchronization signal, and wherein the first processor, when obtaining the synchronization signal, which corresponds to the current time, from the obtaining circuit, starts to measure a set period or causes a timer circuit to start to measure the set period, and at an end of measuring the set period, corrects the measuring time based on the set period and the current time obtained from the second processor.

2. The electronic timepiece according to claim 1, wherein at the end of measuring the set period, the first processor corrects the measuring time to a value of the current time with the set period added.

3. The electronic timepiece according to claim 1, wherein the second processor does not measure the current time.

4. The electronic timepiece according to claim 1, wherein the obtaining circuit includes a receiver that receives a radio wave from a positioning satellite, and identifies the current time based on the radio wave received from the positioning satellite.

5. The electronic timepiece according to claim 1, wherein a power efficiency of the second processor is lower during low-load processing and higher during high-load processing than a power efficiency of the first processor.

6. An electronic timepiece comprising:

an obtaining circuit that obtains information on a current time from outside;

a first processor that measures time; and a second processor connected to the obtaining circuit, wherein the second processor, when obtaining the current time from the obtaining circuit, outputs the current time and a synchronization signal corresponding to the current time to the first processor, wherein the first processor obtains the current time and the synchronization signal from the second processor, and corrects the measuring time, which the first processor is measuring, by synchronizing the current time with the synchronization signal, and wherein the first processor, when obtaining the synchronization signal, which corresponds to the current time, from the second processor, starts to measure a set period or causes a timer circuit to start to measure the set period, and at an end of measuring the set period, corrects the measuring time based on the set period and the current time obtained from the second processor.

7. The electronic timepiece according to claim 6, wherein at the end of measuring the set period, the first processor corrects the measuring time to a value of the current time with the set period added.

8. An electronic timepiece comprising:

an obtaining circuit that obtains information on a current time from outside;

a first processor that measures time; and a second processor connected to the obtaining circuit, wherein the first processor:

obtains a synchronization signal corresponding to the current time, obtains the current time, which the second processor obtains from the obtaining circuit, and based on the current time and the synchronization signal, corrects the measuring time, which the first processor is measuring, wherein when obtaining the information on the current time, the obtaining circuit outputs the synchronization signal to the first processor at a changing timing of seconds, wherein when receiving the synchronization signal, the first processor makes a request to the second processor for the current time, and wherein when receiving the request from the first processor, the second processor outputs the current time obtained from the obtaining circuit to the first processor.

9. The electronic timepiece according to claim 8, wherein when obtaining the current time from the obtaining circuit, the second processor outputs an obtaining-done notification to the first processor, and wherein when receiving the synchronization signal and the obtaining-done notification, the first processor makes the request to the second processor for the current time.

10. A non-transitory computer readable storage medium storing a program executable by an electronic timepiece including an obtaining circuit that obtains information on a current time from outside, a first processor that measures time, and a second processor connected to the obtaining circuit, the program causing the first processor to:

obtain a synchronization signal corresponding to the current time from the obtaining circuit;

obtain the current time, which the second processor obtains from the obtaining circuit, from the second processor; and correct the measuring time, which the first processor is measuring, by synchronizing the current time with the synchronization signal, wherein the program further causes the first processor to, when obtaining the synchronization signal, which corresponds to the current time, from the obtaining circuit, start to measure a set period or cause a timer circuit to start to measure the set period, and at an end of measuring the set period, correct the measuring time based on the set period and the current time obtained from the second processor.

11. A time correction method that is performed by an electronic timepiece, the electronic timepiece including an obtaining circuit that obtains information on a current time from outside, a first processor that measures time, and a second processor connected to the obtaining circuit, and the method comprising, with the first processor:

obtaining a synchronization signal corresponding to the current time from the obtaining circuit;

obtaining the current time, which the second processor obtains from the obtaining circuit, from the second processor; and correcting the measuring time, which the first processor is measuring, by synchronizing the current time with the synchronization signal, wherein the first processor, when obtaining the synchronization signal, which corresponds to the current time, from the obtaining circuit, starts to measure a set period or causes a timer circuit to start to measure the set period, and at an end of measuring the set period, corrects the measuring time based on the set period and the current time obtained from the second processor.

12. A non-transitory computer readable storage medium storing a program executable by an electronic timepiece including an obtaining circuit that obtains information on a current time from outside, a first processor that measures time, and a second processor connected to the obtaining circuit, the program causing the first processor to:

obtain a synchronization signal corresponding to the current time;

obtain the current time, which the second processor obtains from the obtaining circuit; and based on the current time and the synchronization signal, correct the measuring time, which the first processor is measuring, wherein when obtaining the information on the current time, the obtaining circuit outputs the synchronization signal to the first processor at a changing timing of seconds, wherein when receiving the synchronization signal, the first processor makes a request to the second processor for the current time, and wherein when receiving the request from the first processor, the second processor outputs the current time obtained from the obtaining circuit to the first processor.

13. A time correction method that is performed by an electronic timepiece, the electronic timepiece including an obtaining circuit that obtains information on a current time from outside, a first processor that measures time, and a second processor connected to the obtaining circuit, and the method comprising, with the first processor:

obtaining a synchronization signal corresponding to the current time;

obtaining the current time, which the second processor obtains from the obtaining circuit; and based on the current time and the synchronization signal, correcting the measuring time, which the first processor is measuring, wherein when obtaining the information on the current time, the obtaining circuit outputs the synchronization signal to the first processor at a changing timing of seconds, wherein when receiving the synchronization signal, the first processor makes a request to the second processor for the current time, and wherein when receiving the request from the first processor, the second processor outputs the current time obtained from the obtaining circuit to the first processor.

* * * * *